United States Patent
Lees, III et al.

(10) Patent No.: US 7,313,895 B2
(45) Date of Patent: *Jan. 1, 2008

(54) MOLDING UNIT FOR FORMING DIRECT INJECTION MOLDED CLOSURES

(75) Inventors: John N. Lees, III, Golden Valley, MN (US); Terry B. Berglin, Maple Grove, MN (US); Thomas S. Breidenbach, Maple Grove, MN (US); Andrew J. Dahl, Minneapolis, MN (US); Terry Erickson, St. Paul, MN (US); Gregory A. Reed, Cottage Grove, MN (US); Michael Robertson, Roseville, MN (US)

(73) Assignee: Tetra Laval Holdings & Finance, SA, Pully (CH)

( * ) Notice: Subject to any disclaimer, the term of this patent is extended or adjusted under 35 U.S.C. 154(b) by 105 days.

This patent is subject to a terminal disclaimer.

(21) Appl. No.: 10/894,759

(22) Filed: Jul. 20, 2004

(65) Prior Publication Data

US 2006/0016152 A1   Jan. 26, 2006

(51) Int. Cl.
*B65B 61/18* (2006.01)
*B29C 45/04* (2006.01)

(52) U.S. Cl. .......................... 53/133.2; 493/85; 493/87; 493/211; 493/213; 264/328.1; 264/328.11

(58) Field of Classification Search ............... 53/132.2, 53/140; 493/85, 87, 211, 927, 929, 84, 213; 425/116, 127, 129.1; 264/5, 13, 328.1, 328.11
See application file for complete search history.

(56) References Cited

U.S. PATENT DOCUMENTS 3,712,449 A   1/1973   Holovnia et al.
4,725,213 A   2/1988   Reil et al.

(Continued)

FOREIGN PATENT DOCUMENTS

EP   0 935 522   9/1997

(Continued)

OTHER PUBLICATIONS

PCT International Search Report (3 Pages) for PCT/US2005/017984.

*Primary Examiner*—Christopher Harmon
(74) *Attorney, Agent, or Firm*—Levenfeld Pearlstein, LLC (57) ABSTRACT

A form, fill and seal packaging machine is configured to mold a closure directly onto a carton. The machine includes a carton erection station to receive and erect a carton and a direct injection molding station. The molding station has an internal mold tool for receipt of the carton, and an external mold tool set. The internal tool and external tool set are configured to receive and secure a portion of the carton therebetween and define a mold cavity with the portion of the carton disposed therein. The external mold tool set defines an opening for receiving a polymer injection system to inject polymer into the mold cavity. A closure is directly molded in place on the carton, with the polymer encapsulating the inner peripheral edge of the carton opening that is disposed within the mold cavity. The packaging machine also includes a filling station for filling the carton and a sealing station for forming a seal on the carton.

45 Claims, 9 Drawing Sheets

U.S. PATENT DOCUMENTS

| | | | |
|---|---|---|---|
| 5,423,444 A * | 6/1995 | Druitt | 215/344 |
| 5,423,670 A * | 6/1995 | Hamel | 425/144 |
| 5,492,592 A | 2/1996 | Bergholtz et al. | |
| 5,667,745 A * | 9/1997 | Andersson | 264/275 |
| 5,704,541 A * | 1/1998 | Mogard | 229/125.15 |
| 5,820,807 A * | 10/1998 | Urmston | 264/318 |
| 5,824,256 A * | 10/1998 | Ballester | 264/318 |
| 6,012,267 A | 1/2000 | Katsumata | |
| 6,467,238 B1 | 10/2002 | Lees et al. | |
| 6,536,187 B2 | 3/2003 | Lees et al. | |
| 6,626,315 B2 * | 9/2003 | Lees et al. | 220/259.1 |
| 6,837,697 B2 * | 1/2005 | Lees et al. | 425/112 |
| 6,948,923 B2 * | 9/2005 | Lees et al. | 425/112 |
| 2002/0028270 A1 | 3/2002 | Gustafsson et al. | |

FOREIGN PATENT DOCUMENTS

| | | | |
|---|---|---|---|
| EP | 0862980 | * | 9/1998 |
| EP | 0 978 471 | | 7/1999 |
| FR | 1 408 567 A | | 8/1965 |
| GB | 920146 | | 3/1963 |
| GB | 2 050 236 A | | 1/1981 |
| WO | 00/20194 | | 4/2000 |

* cited by examiner

MOLDING UNIT FOR FORMING DIRECT INJECTION MOLDED CLOSURES

BACKGROUND OF THE INVENTION

This invention pertains to a molding unit for molding closures onto containers. More particularly, this invention pertains to a molding unit for directly injection molding a closure onto a paperboard container. Consumers have come to recognize and appreciate resealable closures for containers to store, for example, liquid food products and the like. These resealable closures permit ready access to the product while providing the ability to reseal the container to prolong the life and freshness of the product. Typically, the containers or cartons are formed from a composite of paperboard material having one or more polymer coatings or layers to establish a liquid impervious structure.

In known containers having such closures, the closures, which are formed in a separate process and transported to the packaging process, are conventionally affixed to the containers as part of the overall form, fill and seal operation. Typically, the closures are affixed to the partially erected carton prior to filling the carton with product. One known method for affixing the closure to the carton uses an ultrasonic welding process. In this process, the carton is partially erected and the closure is brought into contact with the carton, overlying an opening in the carton. Subsequently, an anvil is placed against the carton material and an ultrasonic horn is brought into contact with a flange of the closure. The ultrasonic horn is actuated which ultrasonically welds the flange to the carton material.

Another method for affixing closures to cartons uses an induction heating process. In this process, again, an anvil is placed on the carton material and an induction sealing head is brought into contact with the flange. A current is induced in the induction sealing head which, again, results in welding the flange to the carton.

In still another method for incorporating such closures onto paperboard cartons, a mold tool is closed over the carton (having an open area around which the closure is formed). The tool includes internal and external tool portions that are positioned at the interior and exterior regions of the carton, respectively.

Such an arrangement is disclosed in Lees et al., U.S. Pat. Nos. 6,467,238 and 6,536,187, which patents are commonly assigned with the present application and are incorporated herein by reference. In the Lees et al. patent, internal and external tools form inner and outer surfaces of the mold cavity. The internal tool is stationary and is rigidly mounted to a mandrel for supporting the carton during the molding process. The internal tool further includes a bore for receiving a sprue bushing (or injecting the plastic) and a gate through which the liquefied plastic flows into the cavity.

A pair of external tools compress the carton against the internal tool. The external tools are mounted to a press mechanism to provide two-directional movement of the external tools. One direction of movement is toward and way from the internal tool and the other direction of movement moves the external tool halves toward and away from one another. When the external tools are pressed against one another and pressed against the internal tool, the tools collectively form the mold cavity into which the polymer is injected.

While this arrangement functions well, it has been found that it is quite cumbersome and requires a configuration, at angles, of parts to insert into the carton interior for introducing the molten plastic (at the carton interior) for injection into the mold. It has also been found that with the internally-injected arrangement, the carton must move in a direction that is perpendicular to the surface onto which the closure is molded. This tends to reduce carton handling reliability. Moreover, it has been observed that this can limit the size and type or configuration of the closure that can be molded onto the carton. As such, standing alone such a system configuration is quite acceptable. However, in that the closure molding process and system must be integrated into an overall form, fill and seal process and machine, the injection molding system in which plastic is introduced into the mold from the interior of the carton, adversely impacts overall system integration and the final carton/closure product.

Accordingly, there exists a need for a molding system for directly molding resealable closures onto cartons. Such a system includes a plastic injection site that is at an exterior region of the carton. Desirably, such a system is configured for integration into existing form, fill and seal packaging machine systems.

BRIEF SUMMARY OF THE INVENTION

A form, fill and seal packaging machine is configured to mold a closure directly onto a carton. The machine includes a carton erection station to receive and erect a carton and a direct injection molding station.

The molding station has an internal mold tool for receipt in the carton, and an external mold tool set. The internal tool and external tool set are configured to receive and secure a portion of the carton therebetween and define a mold cavity with the portion of the carton disposed therein. The external mold tool set defines an opening for receiving a polymer injection system to inject polymer into the mold cavity.

A closure is directly molded in place on the carton, with the polymer encapsulating the inner peripheral edge of the carton opening that is disposed within the mold cavity. The packaging machine also includes a filling station for filling the carton and a sealing station for forming a seal on the carton.

Such a system includes a plastic injection site that is at an exterior region of the carton. A preferred system is configured for integration into existing form, fill and seal packaging machine systems.

In a preferred system, the external tool set is formed having first and second portions configured to move toward and engage one another in a closed position and away from one another in an open position, such that the internal tool moves toward the external tool set and engages the external tool set to define the mold cavity.

In one embodiment, the molding station includes a frame to which a mandrel is mounted onto which the carton is mounted during molding of the closure. The internal mold tool is mounted to the mandrel, and the mandrel is moved toward and away from the external tool set by a drive. A clamp assembly engages the external tool set to maintain the tool set portions engaged with one another during molding of the closure.

A preferred molding system includes a carton stop surface located to properly longitudinally position the carton between the internal tool and the external tool set and to properly position the inner peripheral edge of the carton opening in the mold cavity. In such an arrangement, the carton stop surface is formed on the internal tool. The external tool set includes a recess for mating with the carton stop surface.

In a present molding system, a carton centering element is located to properly laterally position the carton between the internal tool and the external tool set and to properly position the inner peripheral edge of the carton opening in the mold cavity. The centering element is disposed on the internal tool and is received in the external tool recess.

The tool set (that is, the internal or external tool) includes a stop wall that is adapted to engage the other of the tools. The stop wall is configured to space the internal and external tools from one another a precise and predetermined distance to properly define the mold cavity.

The internal mold tool includes a plug portion extending outwardly therefrom. A plurality of carton gripping elements are formed in the tool with that gripping elements being disposed adjacent the plug and within the mold cavity. In a present tool, the carton gripping elements are disposed in a shallow well, peripherally around the plug, and oriented generally radially relative to the plug.

Other features and advantages of the present invention will be apparent from the following detailed description, the accompanying drawings, and the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Figure 1:
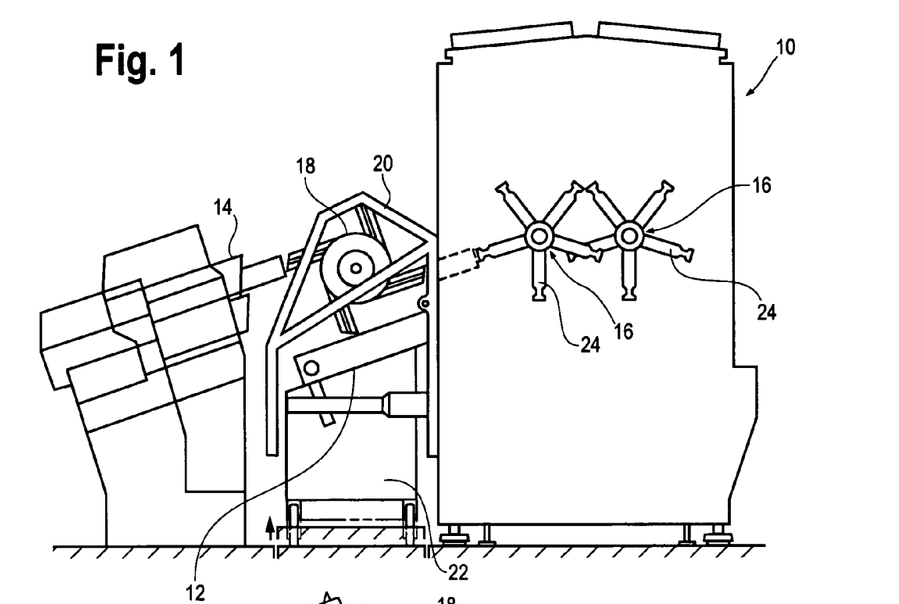
FIG. 1 is a side view of a form, fill and seal packaging machine and a carton magazine/erector with a closure forming device (molding unit) embodying the principles of the present invention disposed between the magazine and the packaging machine and further illustrating an associated carton transfer unit positioned above the molding unit.
Figure 2:
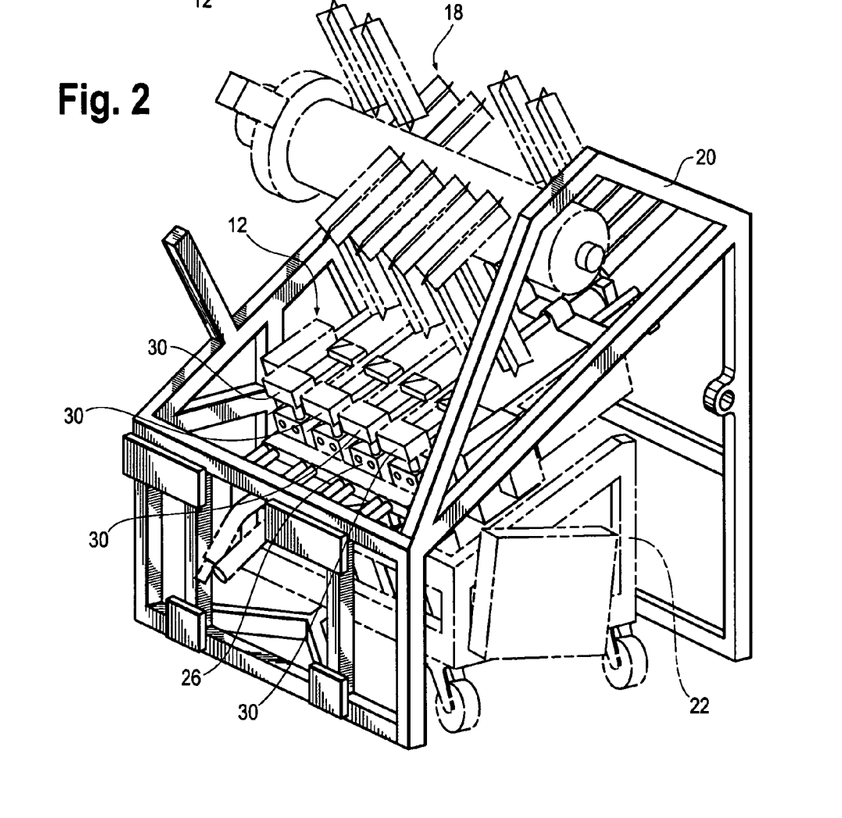
FIG. 2 is a perspective view of the molding unit and transfer unit, the molding unit being positioned on a cart within a frame (that supports the transfer unit), the frame and molding unit cart being positioned between the magazine and the packaging machine.
Figure 3:
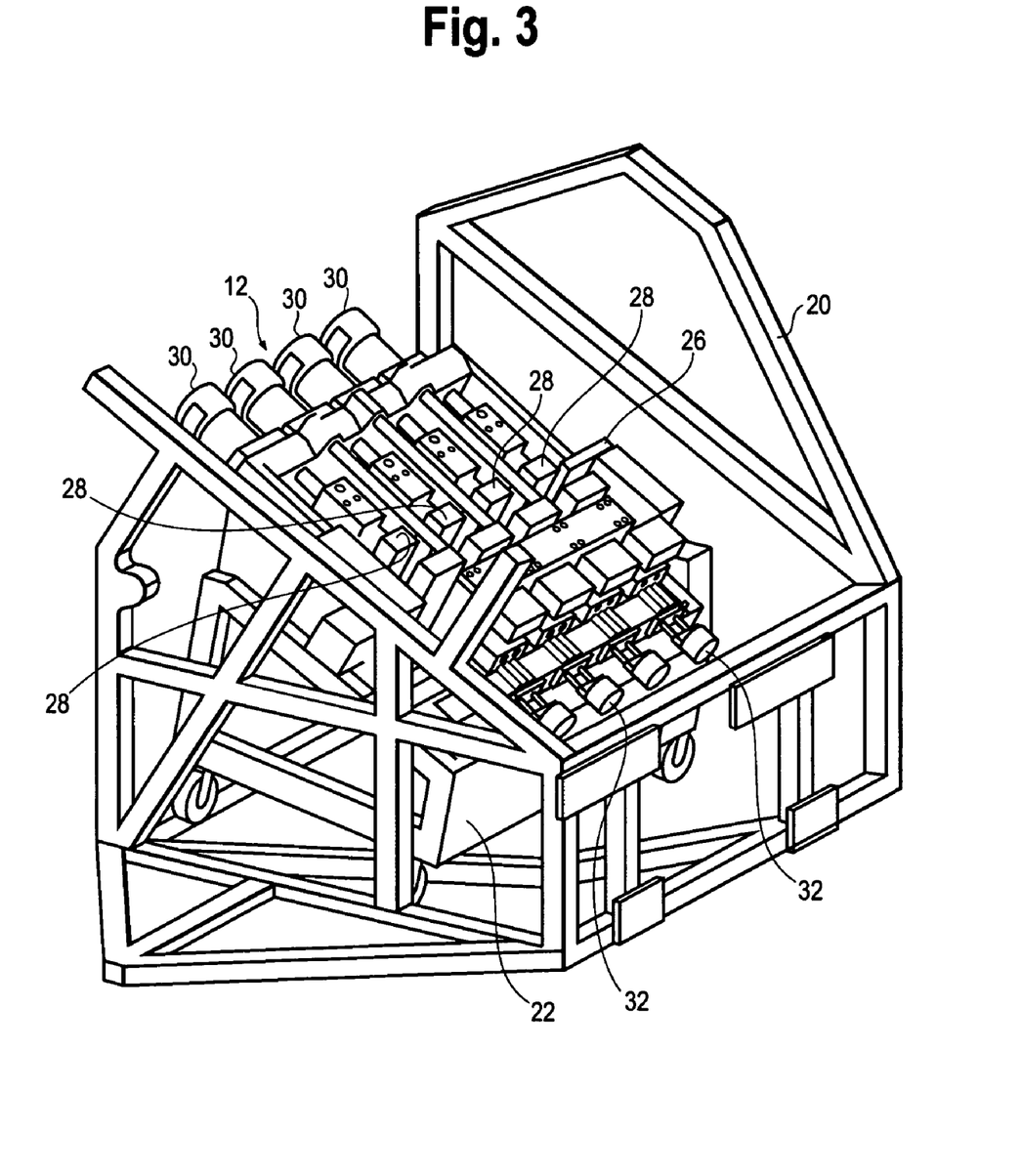
FIG. 3 is a perspective view of the molding unit as supported on the cart within the frame.
Figure 4:
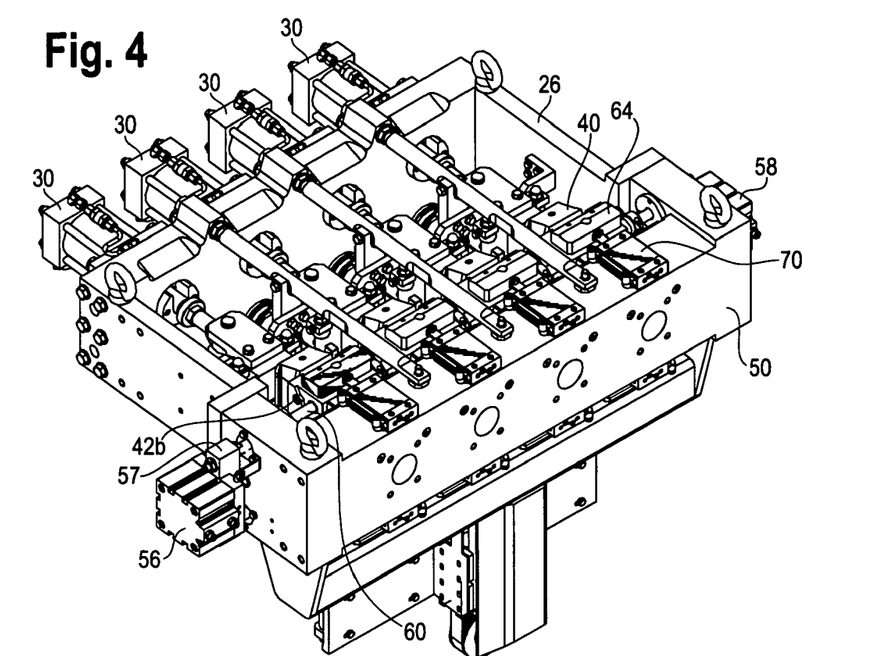
FIG. 4 is a perspective side view of the molding unit shown removed from the cart and frame for ease of illustration.
Figure 5:
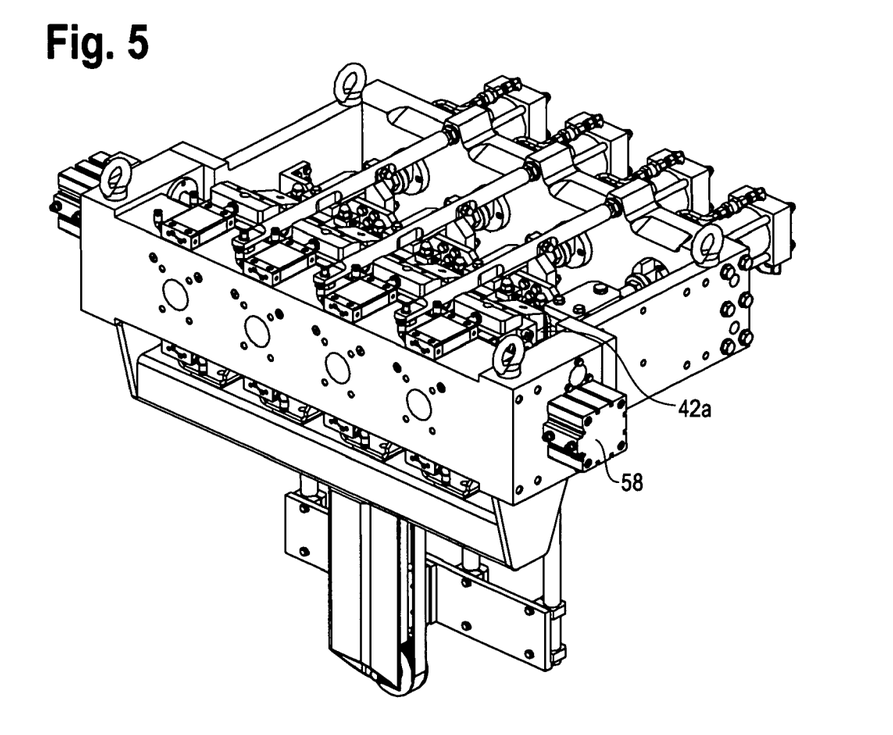
FIG. 5 is a perspective side view of the molding unit shown from the opposite side of that of FIG. 4 and which, similar to FIG. 4, is shown removed from the cart and frame for ease of illustration.

Referring now to the figures in particular to FIG. 1 there is shown an exemplary form, fill and seal packaging machine 10 having a molding unit 12 embodying the principles of the present invention interposed between a carton magazine/erector 14 and a carton bottom sealing station machine turret 16. A transfer unit 18 is positioned over the molding unit 12.

The transfer unit 18 and molding unit 12 are mounted at a transfer unit frame 20 (with the molding unit 12 mounted to a cart 22 residing within the frame 20), that is disposed between the magazine/erector 14 and the form, fill and seal machine 10. An exemplary form, fill and seal machine 10 can be such as that disclosed in Katsumata, U.S. Pat. No. 6,012,267, which patent is commonly assigned with the present application and is incorporated herein by reference.

A carton C is transferred from the carton magazine/erector 14 and is delivered to the molding unit 12 by the transfer unit 18. Following molding of the closure S, the carton C is removed from the molding unit 12 and is transferred, again by the transfer unit 18, to the carton mandrels 24 on the machine turret 16 for bottom forming and sealing. The transfer unit 18 is disclosed in copending U.S. patent application Ser. No. 10/763,893 to Breidenbach et al., which application is commonly assigned with the present application, and which application is incorporated herein by reference.

It was found that although the molding device disclosed in the aforementioned Lees et al. patents functions well, the carton has to move in a direction that is perpendicular to the direction (plane) of the carton surface onto which the closure is molded. This tends to reduce carton handling reliability. Moreover, it has been found that this can limit the size and type or configuration of the closure that can be molded onto the carton.

As seen in FIG. 1, a molding unit 12 embodying the principles of the present invention includes a frame 26 and carries a plurality of mandrels 28 onto which cartons C are positioned for molding of the closures S. The illustrated molding unit 12 includes four molding stations 30, each having a mandrel 28, onto which cartons C are loaded for simultaneous closure S molding. It will be appreciated that the number of stations 30 can vary depending upon the desired arrangement.

The station 30 is mounted to the frame 26. The station 30 includes a polymer injection system 32 having a needle 34, and a sprue bushing 36, as disclosed in the aforementioned patent to Lees et al. The station 30 further includes an internal tool or mold 38, the mandrel 28, and a mandrel cap 40 mounted to the mandrel 28. The internal tool 38 is mounted to the mandrel 28 for insertion into the carton C (e.g., for positioning the carton C on the mandrel 28 over the tool 38) for closure S molding. The station 30 also includes an external tool or mold 42 that is formed from mating external tool portions 42a,b (or halves) that mate with one another and with the internal tool 38 (with the carton C between the internal and external tools 38, 42).

The frame 26 is provided for structure and for mounting the system components. The frame 26 supports the mandrels 28 on which the cartons C reside for molding.

The mandrel 28 is mounted to the frame 26 by a reciprocating element 44, such as the illustrated hydraulic cylinder. A shaft assembly 46 is mounted to the frame 26, extending parallel to the cylinder 44 extension, to assure straight, even movement of the mandrel 28. To this end, the mandrel 28 "slides" along the shaft assembly 46. Guide rollers (not shown) are operably mounted to the frame 26 for contact with the mandrel 28 to prevent rotational movement of the mandrel 28. The mandrel 28 is moved by the cylinder 44 toward and away from a rigid, fixed chassis plate 50. The chassis plate 50 is rigidly mounted to the frame 26. The pressure generated by the cylinder 44 holds the mandrels 28 in place during molding.

The internal mold tool 38 is mounted to the mandrel 28 and the external mold tool 42 is operably and movably mounted to the chassis plate 50. The internal mold tool 38 includes a plug portion 52 that defines the inside of the closure S spout. Conversely, the external tool 42 defines the outer bounds of a cavity 54 that defines the outside of the closure S spout. When the internal and external tools 38, 42 are mated with one another, they define the cavity 54 that spatially defines the closure S.

The polymer injection system 32 is that portion of the molding unit 12 that receives the polymer (e.g., in a solid, such as pellet form), liquefies the polymer and transports (injects) it to the closure mold tools 38, 42. A contemplated polymer injection system can be such as that disclosed in the aforementioned patents to Lees et al.

Referring again to FIGS. 6-9, the mandrels 28 move longitudinally toward and away from the external mold tools 42 by action of the cylinder 44. The external tools 42 are split tools, that is, each of the external tools 42 is formed from first and second tool portions 42a and 42b (or halves) that move toward and away from each other. The external tools 42 move laterally or transverse to the direction that the mandrels 28 move. Thus, when the external tool portions 42a,b separate and the mandrel 28 moves away from the external tools 42, the mold is fully open.

Each of the first external tool portions 42a move by action of a single drive element, such as the exemplary pneumatic cylinder 56 and reciprocating drive rod 60 that are mounted to each of the first tool portions 42a and each of the second tool portions 42b move by action of a single drive element, such as the exemplary pneumatic cylinder 58. The cylinder 56 rod (not shown) is mounted to the frame 26 and the cylinder body 56 is mounted to a yoke 57. The yoke 57 is attached to a pair of drive rods 60 (one shown) that traverse through a side of the frame 26 and through each of the first and second tool portions, 42a and 42b but is affixed or mounted to only the first tool portions 42a.

The second tool portions 42b are mounted to one another by a connecting flange 62 that extends from each of the second tool portions 42b and mounts to adjacent second tool portions. The second tool portions 42b are also driven such that actuation of the second cylinder 58 moves each of the second tool portions 42b. In this manner, the first and second tool portions 42a and 42b move between the open and closed positions in a coordinated manner.

In the open position, the tool portions 42a,b are separated from one another. In the closed position, the tool portions 42a,b are engaged with one another to form the outer part of the mold cavity. Those skilled in the art will recognize that the pressure at which the plastic is injected into the mold can be quite high, on the order of 10,000 to 12,000 pounds per square inch. As such, in order to maintain the tool portions 42a,b engaged with one another to define the mold cavity 54, a clamp assembly 64 (two associated with each of the mold assemblies 30) moves longitudinally into engagement with the external tools 42a,b to assure that the tools 42 are secured together to maintain the mold closed and the cavity 54 defined.

Figures 6, 7, 8, 9:
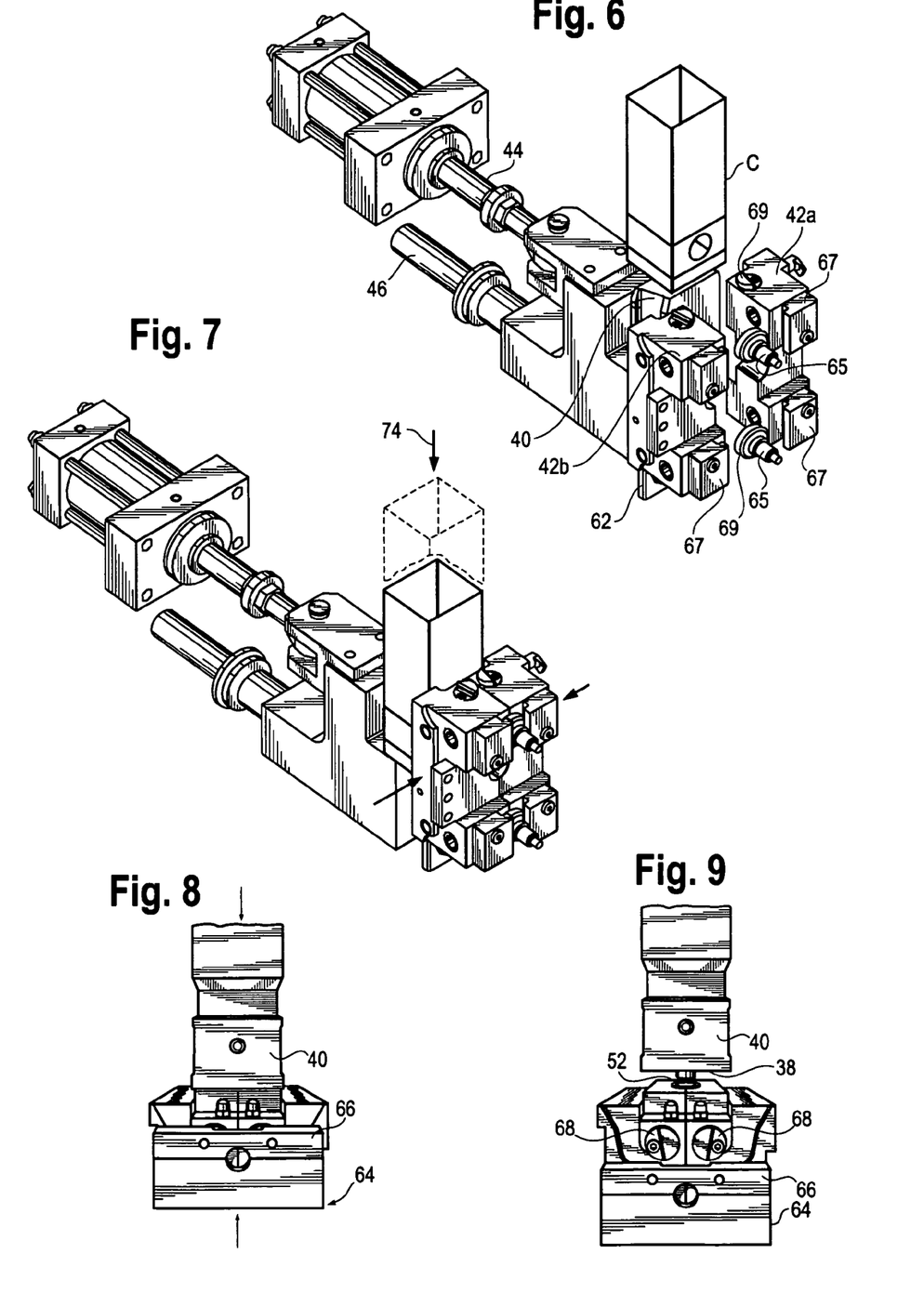
FIG. 6 is a perspective illustration of the molding unit showing one of the molding stations and illustrating a carton as it is inserted onto the molding unit mandrel, the molding unit being shown with the external tools separated.
FIG. 7 is a perspective view of the carton inserted onto the mandrel and the external tools closed for molding the closure.
FIG. 8 is a top view illustrating the internal tool moved forward into engagement with the external tools and the external tools closed.
FIG. 9 is a top view illustrating the internal tool moved rearward (for loading the carton onto or removing the carton from the mandrel) and with the external tool clamp disengaged from the external tools.
Figure 10:
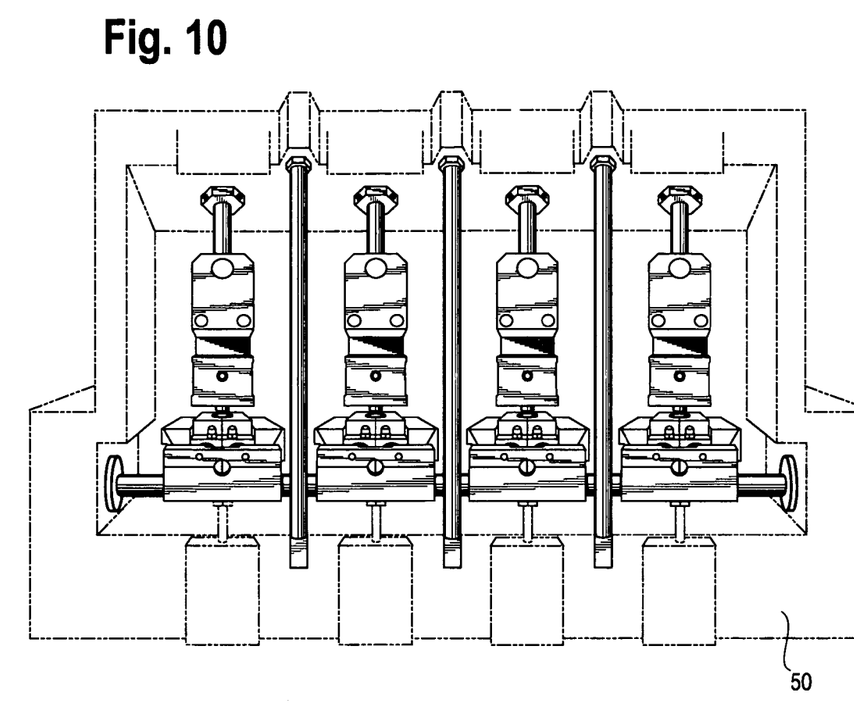
FIG. 10 is a top view of the molding unit showing the external tools in the closed position and showing the clamp in the engaged position.
Figure 11:
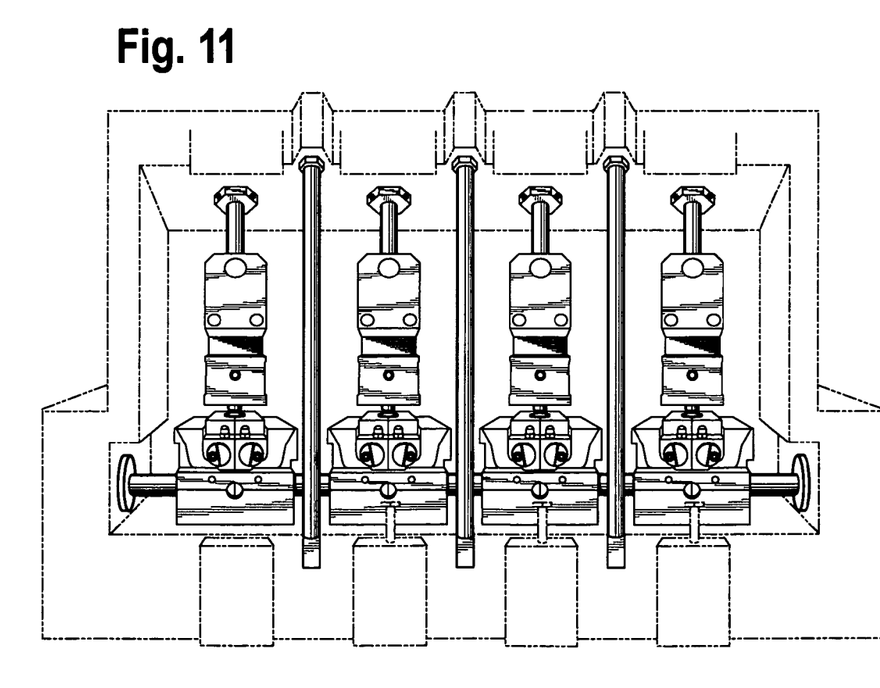
FIG. 11 is a top view of the molding unit showing the external tools in the closed position but with the clamp in the disengaged position.

In addition, in order to maintain the external tool portions 42a,b engaged with one another and flush against the chassis plate 50 when the clamp assemblies 64 are actuated, as seen in FIGS. 6-7, a pair of securing posts 65 engage locking flanges 67 on each of the tools 42a,b. The posts 65 are fixedly mounted to the chassis plate 50, and are thus quite rigidly supported. As the tools 42a,b move together, the flanges 67 (which are rigidly mounted to the external tool portions 42a,b) engage heads 69 on the posts 65 and prevent the tools 42a,b from pulling forward (toward the mandrel 28) and rotating away (from the mandrel 28).

The clamp assembly 64 moves longitudinally in toward the mold portions 42ab, to interfere with lateral movement (opening) of the portions 42a,b. In a present molding unit 12, the clamp 64 includes a body 66 that moves over and engages a locking stub 68 extending from each of the tool portions 42a, 42b. The body 66 moves toward and away from the tool portions 42a,b, i.e., is driven, by actuation of a drive 70, such as the illustrated pneumatic cylinder. Other drives, including electric actuators, pneumatic actuators and the like are also contemplated.

Figure 12:
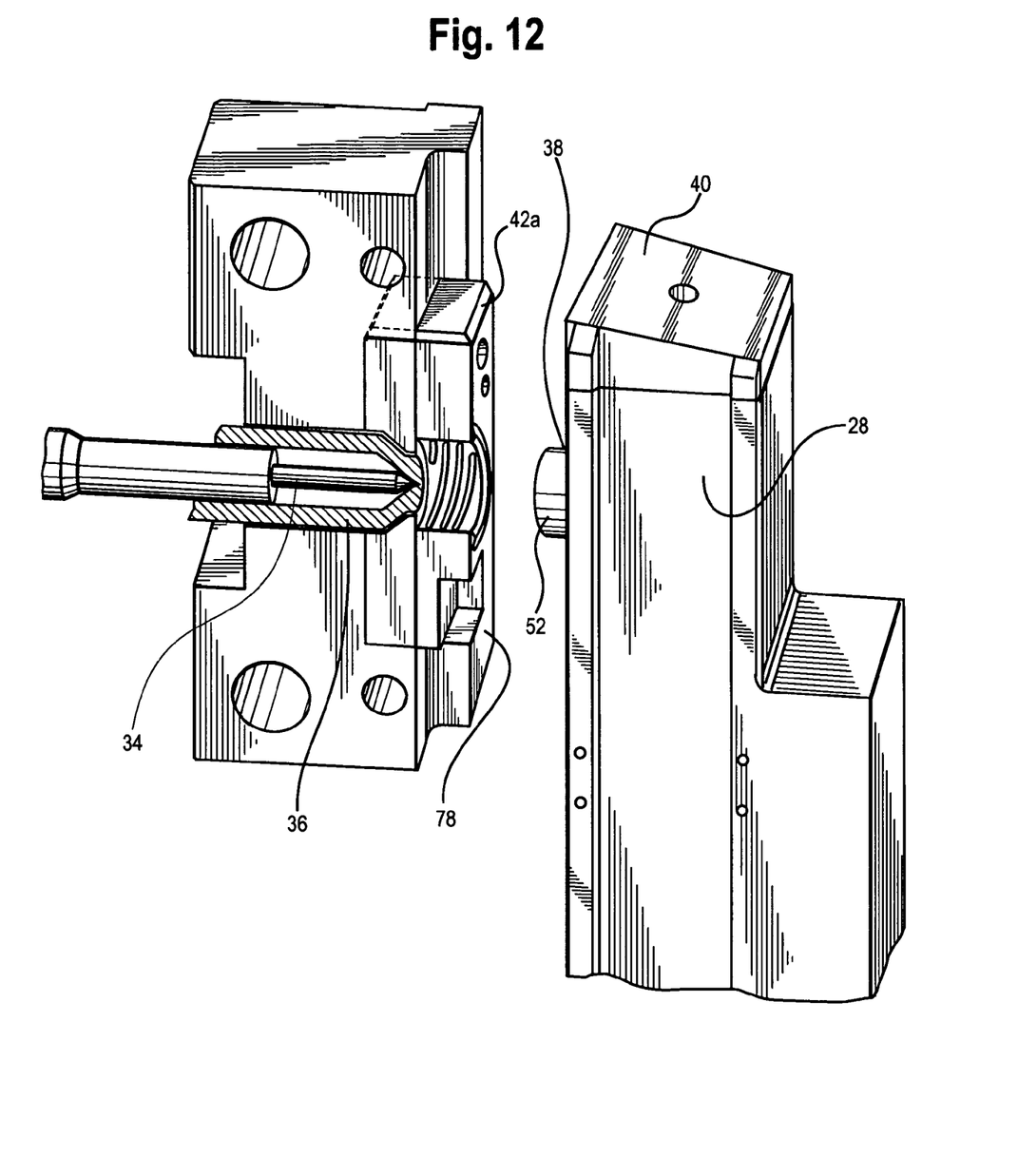
FIG. 12 is a partial cross-sectional view of the molding components showing the needle positioned within the sprue bushing and the sprue bushing positioned within the internal mold tool.
Figure 13:
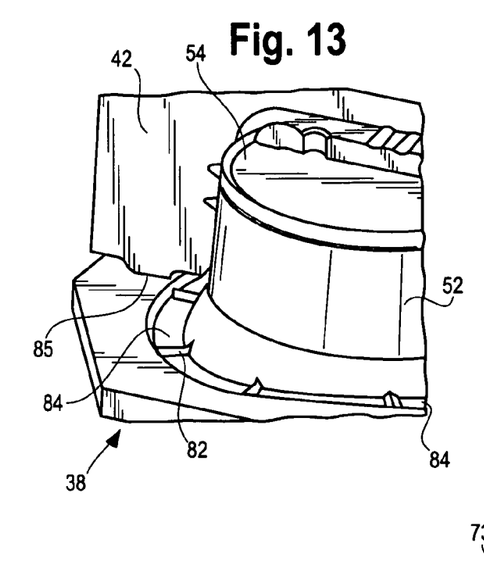
FIG. 13 is an enlarged partial view showing the internal tool engaged with one of the external tool portions.
Figure 14A:
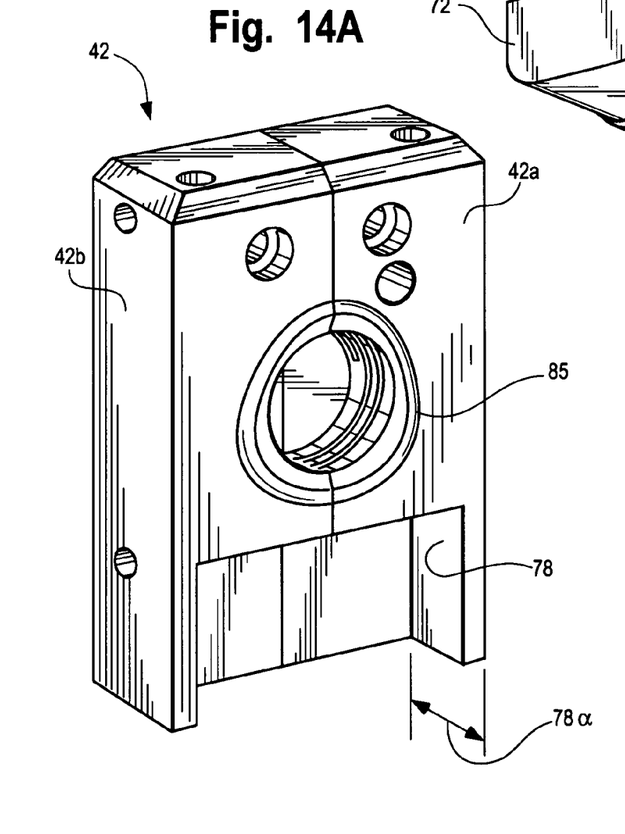
FIG. 14A is a perspective view of the external tools engaged with one another.
Figure 14B:
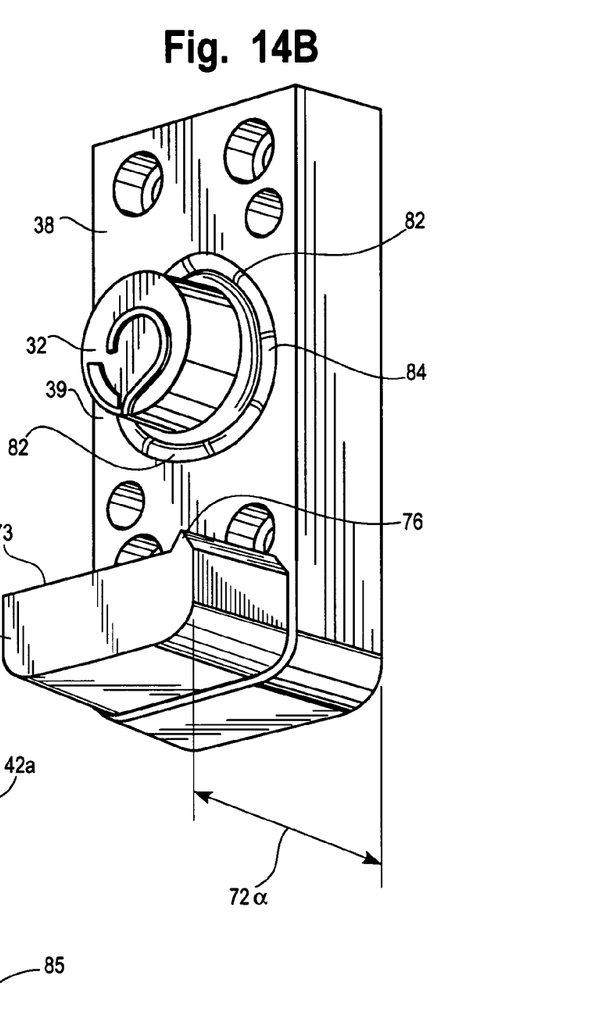
FIG. 14B is a perspective view of the internal tool for use with the external tools of FIG. 14A.

Referring to FIGS. 12-14, the internal tool 38 (which includes the outwardly extending plug 52) and the external tool 42, when engaged with one another, define the cavity 54 which defines the closure S (when plastic is injected into the cavity 54). Each of the tools 38, 42 also serves to assure that it is properly positioned relative to the other so that the cavity 54 is of the proper size for plastic to fill the cavity 54. This assures that the dimensions of the closure S are as designed and that the closure S properly forms. To this end, the tools 38, 42 include a stop wall 72 that serves to space the internal tool 38 from the external tool 42 to properly define the space between the tools 38, 42 (and thus define the mold cavity 54). In this manner, the space or gap between the tools 38, 42 (or the cavity 54), when the tools are closed, is a measured, gauged distance that is dependent upon the distance $d_{72}$ (see FIGS. 14A and 14B) that the wall 72 extends from the tool 38 surface in conjunction with the depth $d_{78}$ of the external tool recess 78.

Control of the distance between the tools 38, 42 facilitates controlling the thickness of the closure and in particular the thickness of the tear membrane that is (in this closure S) formed as part of the closure S. The internal tool 38 also includes a physical carton stop surface, as indicated at 73, for engaging the carton C to prevent over-insertion as the carton C is moved onto the mandrel 28 and as the tools 38, 42 engage one another. The carton stop surface 73 essentially provides for longitudinal positioning of the carton C, i.e., positioning along the length of the mandrel 28 as indicated by the arrow 74 in FIG. 7, by stopping inward movement of the carton C. In a current embodiment, the carton stop surface 73 is formed as part of the stop wall 72, thus integrating the two structures (and functions) into a single element. The surface 73 (as part of the wall 72) extends out farther from the face 39 of the tool 38 than the plug 52 extends out from the face 39 of the tool 38.

The tools 38, 42 also include a centering or aligning projection 76. In the illustrated embodiment, the aligning projection 76 is also formed with, or as part of, the stop wall 72 and the carton stop surface 73. The centering projection 76 has a predetermined, particular shape such that the projection 76 mates with a portion 76' of the carton C (see FIG. 21) to properly laterally position the carton between the mold tools 38, 42. Thus, with the stop surface 73 and the centering projection 76, the carton C is properly positioned between the mold tools 38, 42 by virtue of moving the carton C into the space between until the carton C stops, and the tools 38, 42 are properly spaced from one another by the stop wall 72.

In the illustrated embodiment, the stop wall 72, stop surface 73 and centering projection 76 are positioned on the internal tool 38. The external tool 42 recess 78 receives the stop wall 72 and centering projection 76. As set forth briefly above, dimensionally, the stop wall 72 extends outwardly a distance $d_{72}$ (see FIGS. 14A and 14B), that spaces the internal and external tools 38, 42 from one another a predetermined amount to accommodate the carton C material thickness without over-compressing the material or leaving it "loose" within the mold, between the tools 38, 42. Although the stop wall 72, stop surface 73 and aligning projection 76 are shown integrated into a single structural element in the present tool set 38, 42, those skilled in the art will recognize that these integrated elements 72, 73 and 76 can be formed as separate structural and functional elements. In addition, although the stop wall 72, stop surface 73 and aligning projection 76 are shown projecting outwardly from the internal tool 38, and the cooperating recess 78 is are formed in the external tool set 42*a,b*, those skilled in the art will recognize that the projecting elements 72, 73 and 76 can be formed on the external tool set 42*a,b* and the receiving element or recess 78 formed in the internal tool 38.

Figure 15:
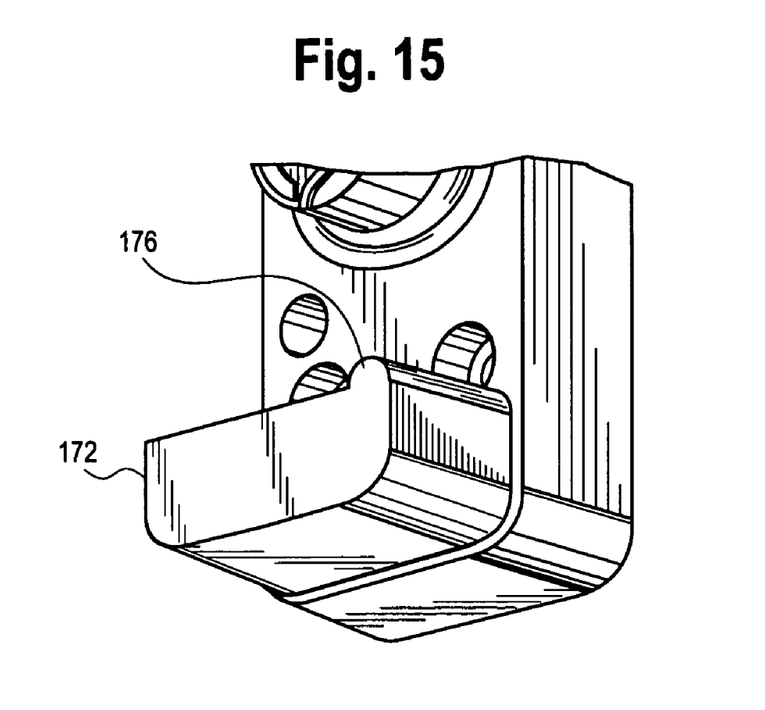
FIGS. 15 and 16 illustrate alternate embodiments of the internal tool.
Figure 16:
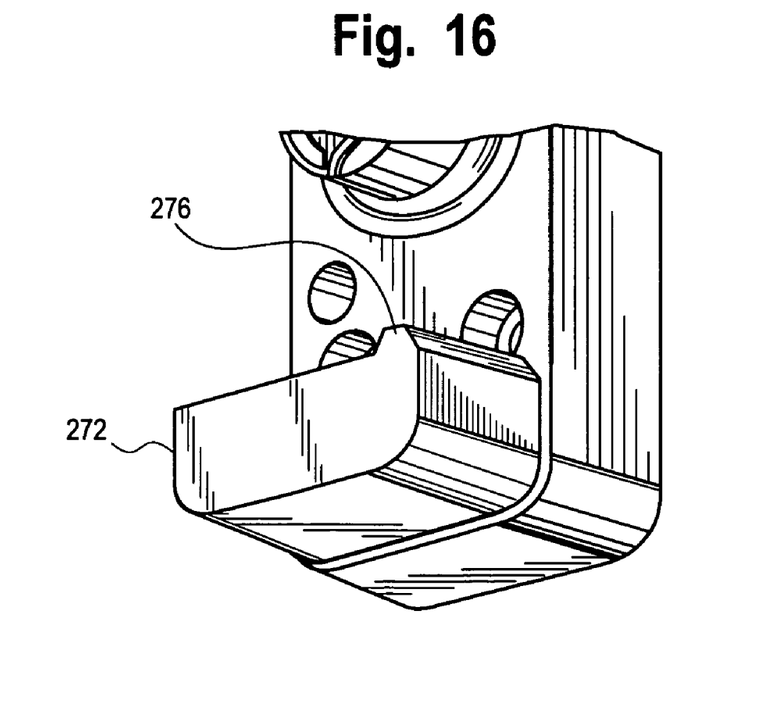
Figure 17:
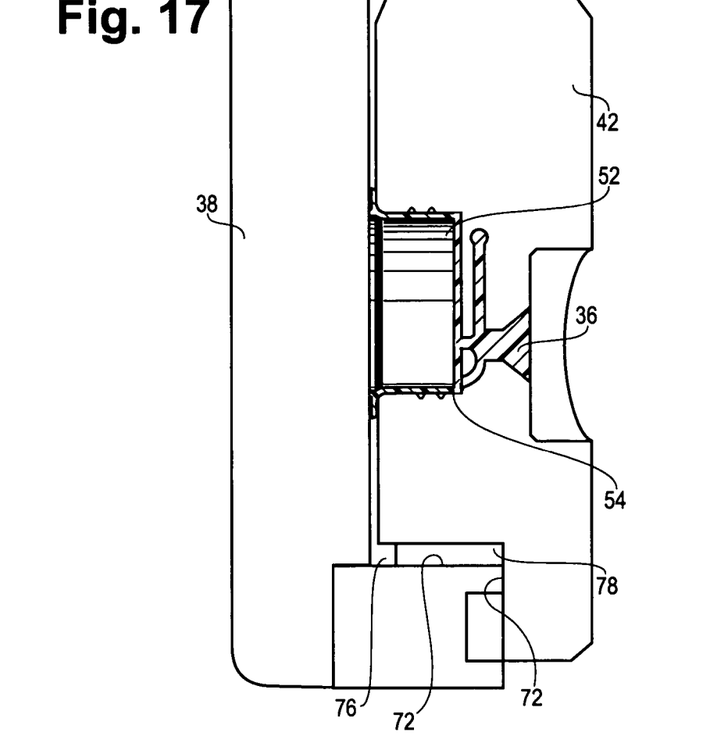
FIG. 17 is a schematic illustration of the mold tools engaged with one another to form the mold cavity.
Figure 18:
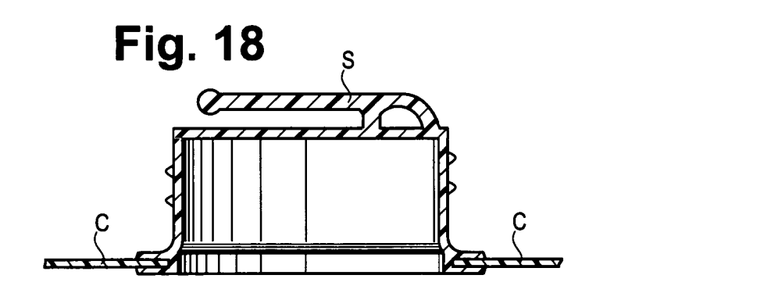
FIG. 18 illustrates an exemplary closure molded to a carton (shown in part)
Figure 19:
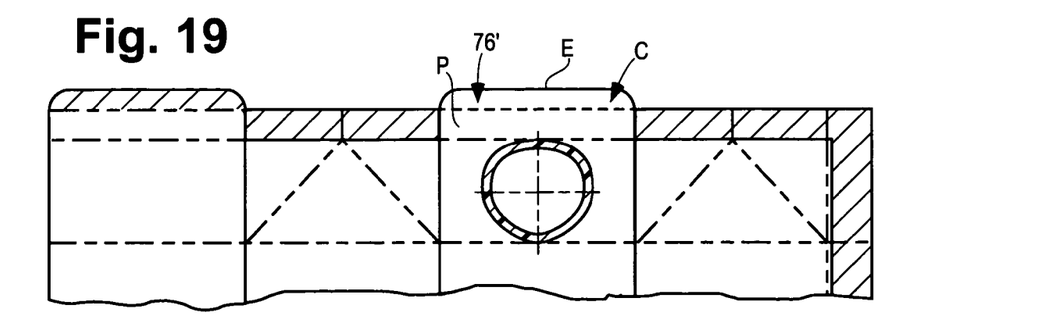
FIG. 19 illustrates a portion of an exemplary carton having a single, central centering notch for use with the present molding unit.

In a present embodiment, the centering projection 76 is formed having a triangle or wedge shape and the carton C has a like triangle or wedge cut-out portion 76' such that as the carton C is moved between the mold tools 38, 42, the sides of the cut-out 76' contact the sides of the projection 76, and laterally shift the carton C, as needed, to position the carton C in the mold unit 12. It will be appreciated by those skilled in the art that other shapes, such as semicircles 176 (FIG. 15), truncated pyramidal shapes 276 (FIG. 16) and the like, as well as plural or other shapes, e.g., pairs of spaced apart projections, can be used, as can cut-out or recess(es) formed in the tool, mating with a tab or projection in the carton, which shapes and configurations, as well as other shapes and configurations, are within the scope and spirit of the present invention. It will also be appreciated that mating carton C cut-outs (or projections or tabs) will be used with such other shapes and configurations.

In order to minimize deflection of the carton C material once it is in the mold and as plastic is injected into the mold cavity 54, paper control ribs 82 extend generally radially from about the base of the plug 52. In a present embodiment, a shallow well or channel 84 is formed around the base of the plug 52 in which the ribs 82 are formed. The ribs 82 support the paper to prevent localized deflection of the carton C. The ribs 82 also tend to improve contact between the flowing polymer and the carton (paper) material which enhances bonding. As seen in FIGS. 13 and 14B, a paper compression ring 85 is formed on the external tool 42 for engaging and compressing the paperboard against the internal tool 38, outside of the well 84. This forms the boundary to which the polymer flows during closure S molding. Those skilled in the art will appreciate that (even though not shown) the paper compression ring can alternately be formed on the internal tool. When the internal and external tools 38, 42 are closed and secured, the paper compression ring 85 is about 0.35 mm from the internal tool to compress the paper to about 0.35 mm from about 0.5 mm.

As will be recognized by those skilled in the art, in conventional closure application techniques, the carton C is provided with a pre-punched or pre-formed opening into which the closure is fitted and subsequently sealed to the carton. The edges around the this area are uncoated in that the opening is formed after manufacture of the composite or laminate structure of the carton material.

Although it is anticipated that cartons with such pre-formed openings will be used with the molding unit 12, it is also anticipated that non-pre-formed material may also be used and that the opening can be formed as part of or integrated with the direct injection molding process.

In operation, the transfer unit 18 rotates to position the cartons C above the molding unit 12. The cartons C are transferred onto the four molding station mandrels 28 simultaneously. The carton molding panel P (that is, that panel of the carton C onto which the closure is molded) is moved between the internal tool plug 52 and the external tool 42. To minimize the amount of movement required within the molding unit, the distance (space) between the plug 52 and the external tool 42 is maintained relatively small, about 4.0 millimeters, or 3.5 mm larger than the thickness of the carton panel P, when the molding unit 12 is in the open position.

As the carton C is moved onto the mandrel 28, between the plug 54 and external tool 42, the edge E of the carton C contacts the stop surface 72 on the internal tool 38. This longitudinally positions the carton C in the mold. In addition, the movement of the carton C into the mold and mating of the internal tool centering projection 76 with the carton cut-out 76' laterally positions the carton C in the mold. In this manner, the carton C is longitudinally and laterally positioned in the molding assembly 30. The mold tools 38, 42 then close, as by inward movement of the external tool portions 42a, 42b and movement of the mandrel 28 (with the internal tool 38) toward the external tools 42. The compression ring 85 grips the carton C material while the control ribs 82 prevent deflection, to facilitate maintaining the position of the carton C between the tools 38, 42 and within the mold cavity 54. The carton C is now positioned between the mold tools 38, 42, the clamp 64 moves into position to secure the external tool portions 42a and 42b, and polymer is injected into the mold cavity 54. It will be appreciated that the external tool portions 42a,b can be closed and the clamps 64 engaged, prior to engaging the internal tool 38 with the external tool 42.

Following a period of time to cool, the mold is opened by releasing the clamp 64, separating the external tool portions 42a, 42b and withdrawing the mandrel 28 (alternately, the mandrel 28 can be withdrawn prior to or contemporaneous with separating the external tool portions 42a,b). The carton C is then removed (pulled) from the mandrel 28 back on to the transfer unit 18. It will be appreciated that because the external tools 42a,b separate from one another, and the internal tool 38 (on the mandrel 28) withdraws, there is sufficient space for the carton C with the closure S molded thereon to move passed the tools 38, 42 without damage to the closure S.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A form, fill and seal packaging machine for forming, filling and sealing a carton, the machine configured to mold a closure directly onto the carton, the carton having a preformed opening therein defined by an inner peripheral edge, the machine comprising:
   a carton erection station, the carton erection station adapted to receive a carton in a generally flat form and erect the flat form carton into a tubular form defining an internal carton region;
   a direct injection molding station having an internal mold tool and an external mold tool set, the internal mold tool received within the internal carton region and the external mold tool set overlying an outer portion of the carton, the external tool set being formed having first and second portions configured to move toward and engage one another in a closed position and away from one another in an open position, the internal mold tool and the external mold tool set configured to receive and secure a portion of the carton therebetween and defining a mold cavity with the portion of the carton disposed therein and the inner peripheral edge of the carton opening positioned within the mold cavity, the external mold tool set, when in the closed position, defining an opening therein from an outer portion extending and opening into the mold cavity, the direct injection molding station further including a polymer injection system received in the external mold tool set opening outside of the internal carton region, the injection system for injecting polymer into the mold cavity, wherein a closure is directly molded in place on the carton, the polymer encapsulating the inner peripheral edge of the carton opening disposed within the mold cavity, and a clamp assembly engageable with the external tool set to maintain the external tool set portions engaged with one another during molding of the closure;
   a filling station for filling the carton; and
   a sealing station for forming a seal on the carton.

2. The form, fill and seal packaging machine in accordance with claim 1, wherein the internal tool moves toward the external tool set and engages the external tool set to define the mold cavity.

3. The form, fill and seal packaging machine in accordance with claim 1, wherein the direct injection molding station includes a frame and wherein the frame includes a mandrel on which the carton is mounted during molding of the closure.

4. The form, fill and seal packaging machine in accordance with claim 3, wherein the internal mold tool is mounted to the mandrel.

5. The form, fill and seal packaging machine in accordance with claim 4 including means for moving the mandrel toward and away from the external tool set.

6. The form, fill and seal packaging machine in accordance with claim 5 wherein the means for moving the mandrel is a hydraulic cylinder.

7. The form, fill and seal packaging machine in accordance with claim 1 including a stop surface located to properly longitudinally position the carton between the internal tool and the external tool set and to properly position the inner peripheral edge of the carton opening in the mold cavity.

8. The form, fill and seal packaging machine in accordance with claim 7 wherein the stop surface is formed, in part, on the internal tool.

9. The form, fill and seal packaging machine in accordance with claim 8 wherein the external tool set includes a recess for mating with the stop surface.

10. The form, fill and seal packaging machine in accordance with claim 1 including a carton centering element located to properly laterally position the carton between the internal tool and the external tool set and to properly position the inner peripheral edge of the carton opening in the mold cavity.

11. The form, fill and seal packaging machine in accordance with claim 10 wherein the carton centering element is disposed on the internal tool.

12. The form, fill and seal packaging machine in accordance with claim 11 wherein the carton centering element is received in a recess in the external tool set.

13. The form, fill and seal packaging machine in accordance with claim 1 wherein the internal mold tool includes a plug portion extending outwardly therefrom and further includes a plurality of carton engaging ribs formed therein, the ribs being disposed adjacent the plug and within the mold cavity.

14. The form, fill and seal packaging machine in accordance with claim 13 wherein the ribs are oriented generally radially relative to the plug.

15. The form, fill and seal packaging machine in accordance with claim 14 including a shallow well disposed peripherally around the plug, and wherein the ribs are disposed, at least in part, within the shallow well.

16. The form, fill and seal packaging machine in accordance with claim 13 including a paper compression ring on the external tool.

17. The form, fill and seal packaging machine in accordance with claim 16 wherein the paper compression ring engages the carton at a location that is outside of the carton engaging ribs.

18. The form, fill and seal packaging machine in accordance with claim 1 including a stop wall disposed on the internal or external tool adapted for engaging the other of the internal or external tool, the stop wall configured to separate and space the internal and external tools from one another a precise, predetermined distance.

19. The form, fill and seal packaging machine in accordance with claim 18 wherein the stop wall is disposed on the internal tool.

20. A direct injection molding station for use on a form, fill and seal packaging machine for forming, filling and sealing a carton having an internal carton region, the molding station being configured to mold a closure on a predetermined portion of the carton at an opening in the carton, the closure encapsulating an inner peripheral edge that defines the opening, the molding station comprising:

an internal mold tool and an external mold tool set, the internal mold tool received within the internal carton region and the external mold tool set overlying an outer portion of the carton, the external tool set being formed having first and second portions configured to move toward and engage one another in a closed position and away from one another in an open position, the internal mold tool and the external mold tool set configured to receive and secure a portion of the carton therebetween and defining a mold cavity with the portion of the carton disposed therein and the inner peripheral edge of the carton opening positioned within the mold cavity, the external mold tool set, when in the closed position, defining an opening therein from an outer portion extending and opening into the mold cavity, the direct injection molding station further including a polymer injection system received in the external mold tool set opening outside of the internal carton region, the injection system for injecting polymer into the mold cavity, wherein a closure is directly molded in place on the carton, the polymer encapsulating the inner peripheral edge of the carton opening disposed within the mold cavity, and a clamp assembly engageable with the external tool set to maintain the external tool set portions engaged with one another during molding of the closure.

21. The direct injection molding station in accordance with claim 20, wherein the internal tool moves toward the external tool set and engages the external tool set to define the mold cavity.

22. The direct injection molding station in accordance with claim 20, wherein the direct injection molding station includes a frame and wherein the frame includes a mandrel on which the carton is mounted during molding of the closure.

23. The direct injection molding station in accordance with claim 22, wherein the internal mold tool is mounted to the mandrel.

24. The direct injection molding station in accordance with claim 23 including a drive for moving the mandrel toward and away from the external tool set.

25. The direct injection molding station in accordance with claim 20 including a carton stop surface located to properly longitudinally position the carton between the internal tool and the external tool set and to properly position the inner peripheral edge of the carton opening in the mold cavity.

26. The direct injection molding station in accordance with claim 25 wherein the carton stop surface is formed, in part, on the internal tool.

27. The direct injection molding station in accordance with claim 26 wherein the external tool set includes a recess for mating with the carton stop surface.

28. The direct injection molding station in accordance with claim 20 including a carton centering element located to properly laterally position the carton between the internal tool and the external tool set and to properly position the inner peripheral edge of the carton opening in the mold cavity.

29. The direct injection molding station in accordance with claim 28 wherein the carton centering element is disposed on the internal tool and the external tool set includes a recess for receiving the carton centering element.

30. The direct injection molding station in accordance with claim 20 wherein the internal mold tool includes a plug portion extending outwardly therefrom and further includes a plurality of carton engaging ribs formed therein, the ribs being disposed about the plug, adjacent thereto, and within the mold cavity.

31. The direct injection molding station in accordance with claim 20 including a paper compression ring on the external tool.

32. The direct injection molding station in accordance with claim 20 including a stop wall disposed on the internal or external tool adapted for engaging the other of the internal or external tool, the stop wall configured to separate and space the internal and external tools from one another a precise, predetermined distance.

33. The direct injection molding station in accordance with claim 32 wherein the stop wall is disposed on the internal tool.

34. A mold tool set for directly molding a closure to a package material, the package material being openable to define an internal carton region, the mold tool set being in flow communication with a polymer injection system for providing polymer to the mold tool set, the mold tool set being positioned within a molding station, comprising:

an internal mold tool and an external mold tool set, the external mold tool set includes first and second tool portions configured to move toward and engage one another in a closed position and away from one another to an open position, and a clamp to maintain the external tool set in the closed position, the internal mold tool configured for receipt within the internal carton region, the internal mold tool and the external mold tool set configured to receive and secure a portion of the carton therebetween and defining a mold cavity with the portion of the carton disposed therein and the inner peripheral edge of the carton opening positioned within the mold cavity, the external mold tool set, when in the closed position, defining an opening therein from an outer portion extending and opening into the mold cavity for receiving a portion of the polymer injection system for injecting polymer into the mold cavity through the external mold tool set, wherein a closure is directly molded in place on the carton, the polymer encapsulating the inner peripheral edge of the carton opening disposed within the mold cavity.

35. The mold tool set in accordance with claim 34 including a stop surface located to properly longitudinally position the carton between the internal tool and the external tool set and to properly position the inner peripheral edge of the carton opening in the mold cavity.

36. The mold tool set in accordance with claim 35 wherein the stop surface is formed, at least in part, on the internal tool.

37. The mold tool set in accordance with claim 36 wherein the external tool set includes a recess for mating with the stop surface.

38. The mold tool set in accordance with claim 34 including a carton centering element located to properly laterally position the carton between the internal tool and the external tool set and to properly position the inner peripheral edge of the carton opening in the mold cavity.

39. The mold tool set in accordance with claim 38 wherein the carton centering element is disposed on the internal tool and the external tool set includes a recess configured to receive with the carton centering element.

40. The mold tool set in accordance with claim 34 wherein the internal mold tool includes a plug portion extending outwardly therefrom and further includes a plurality of carton engaging ribs formed therein, the ribs being disposed about the plug, adjacent thereto, and within the mold cavity.

41. The mold tool set in accordance with claim 40 wherein the carton engaging ribs are oriented generally radially relative to the plug.

42. The mold tool set in accordance with claim 41 including a shallow well disposed peripherally around the plug, and wherein the carton engaging rubs are disposed, at least in part, within the shallow well.

43. The mold tool set in accordance with claim 34 including a paper compression ring on the external tool.

44. The mold tool set in accordance with claim 34 including a stop wall disposed on the internal or external tool adapted for engaging the other of the internal or external tool, the stop wall configured to separate and space the internal and external tools from one another a precise, predetermined distance.

45. The mold tool set in accordance with claim 44 wherein the stop wall is disposed on the internal tool.

* * * * *